(12) United States Patent
Sasaya et al.

(10) Patent No.: US 11,260,702 B2
(45) Date of Patent: Mar. 1, 2022

(54) PNEUMATIC TIRE

(71) Applicant: The Yokohama Rubber Co., LTD., Tokyo (JP)

(72) Inventors: Yuki Sasaya, Hiratsuka (JP); Masaaki Nagayasu, Hiratsuka (JP); Ryohei Takemori, Hiratsuka (JP); Atsushi Tanno, Hiratsuka (JP); Hiraku Kouda, Hiratsuka (JP); Jun Matsuda, Hiratsuka (JP)

(73) Assignee: The Yokohama Rubber Co., LTD.

( * ) Notice: Subject to any disclaimer, the term of this patent is extended or adjusted under 35 U.S.C. 154(b) by 83 days.

(21) Appl. No.: 16/768,625

(22) PCT Filed: Nov. 19, 2018

(86) PCT No.: PCT/JP2018/042671
§ 371 (c)(1),
(2) Date: May 29, 2020

(87) PCT Pub. No.: WO2019/107203
PCT Pub. Date: Jun. 6, 2019

(65) Prior Publication Data
US 2021/0170806 A1  Jun. 10, 2021

(30) Foreign Application Priority Data

Nov. 30, 2017  (JP) .............................. JP2017-230716

(51) Int. Cl.
*B60C 15/024* (2006.01)
*B60C 15/04* (2006.01)
(Continued)

(52) U.S. Cl.
CPC ................ *B60C 15/04* (2013.01); *B60C 9/08* (2013.01); *B60C 15/0036* (2013.01);
(Continued)

(58) Field of Classification Search
CPC .. B60C 2015/048; B60C 15/04; B60C 15/024
See application file for complete search history.

(56) References Cited

U.S. PATENT DOCUMENTS

| 6,202,726 B1 | 3/2001 | Corvasce et al. |
| 6,539,996 B1 | 4/2003 | Corvasce et al. |
| 6,929,046 B1 | 8/2005 | Fontaine et al. |
(Continued)

FOREIGN PATENT DOCUMENTS

| JP | 2000-289415 | 10/2000 |
| JP | 2002-301915 | 10/2002 |
(Continued)

OTHER PUBLICATIONS

Machine Translation: JP-2002301915-A, Tanaka, Masatoshi, (Year: 2021).*

(Continued)

*Primary Examiner* — Kendra Ly
(74) *Attorney, Agent, or Firm* — Thorpe North & Western (57) ABSTRACT

In a cross-section of a pneumatic tire, a contour of the bead core is a polygon formed by tangent lines of circumferential portions of a bead wire, the contour includes a vertex with an acute angle and a bottom side opposite the vertex, the carcass layer is folded back along a circumference of the bead core in a bead portion, a folded back portion of the carcass layer from an outer end of the bead core extends in the radial direction, and a distance in the radial direction between a center of an arc profile of a tire outer surface and a straight line extending in the lateral direction through the vertex is within 20% of a radius r of the arc, and a distance in the lateral direction between the center of the arc and a straight line extending in the radial direction through the vertex is within 2r±0.4r.

10 Claims, 5 Drawing Sheets

(51) Int. Cl.
 *B60C 17/00* (2006.01)
 *B60C 9/08* (2006.01)
 *B60C 15/00* (2006.01)

(52) U.S. Cl.
 CPC ........ *B60C 15/024* (2013.01); *B60C 17/0009* (2013.01); *B60C 2015/044* (2013.01); *B60C 2015/046* (2013.01); *B60C 2015/048* (2013.01)

(56) References Cited

U.S. PATENT DOCUMENTS

| | | |
|---|---|---|
| 2011/0284143 A1 | 11/2011 | Horiuchi |
| 2015/0020944 A1 | 1/2015 | Till et al. |
| 2015/0075691 A1 | 3/2015 | Merino Lopez et al. |
| 2016/0137009 A1* | 5/2016 | Tauchi ................ B60C 15/0054 152/454 |

FOREIGN PATENT DOCUMENTS

| | | | |
|---|---|---|---|
| JP | 2002301915 A * | 10/2002 | ............ D07B 1/062 |
| JP | 2011-240895 | 12/2011 | |
| JP | 2013-052720 | 3/2013 | |
| JP | 2015-020741 | 2/2015 | |
| JP | 2015-516911 | 6/2015 | |
| WO | WO 2013/150024 | 10/2013 | |
| WO | WO 2014/203909 | 12/2014 | |

OTHER PUBLICATIONS

International Search Report for International Application No. PCT/JP2018/042671 dated Feb. 19, 2019, 4 pages, Japan.

* cited by examiner

PNEUMATIC TIRE

TECHNICAL FIELD

The present technology relates to a pneumatic tire including a side reinforcing layer in a sidewall portion and particularly relates to a pneumatic tire with an enhanced bead portion structure and reduced tire weight and good rim disengagement resistance.

BACKGROUND ART

Typically, a bead core and a bead filler are embedded in a bead portion of a pneumatic tire. Also, a pneumatic tire that can safely travel a certain distance with a puncture (i.e., a run-flat tire) typically includes a side reinforcing layer (a layer made of hard rubber with a crescent-shaped cross-sectional shape) disposed in a sidewall portion, the side reinforcing layer bearing the applied load of the vehicle when a tire is punctured. In such a tire, the radially inner end portions of the side reinforcing layer may extend to the bead portion region. This may increase the wall thickness of the bead portion region and increase tire weight. Also, a side reinforcing layer increases the rigidity of the region where the rim flange abuts the tire. Thus, in a run-flat running condition, a force is generated that rotates the bead portion in the tire inner direction about a point as a fulcrum where the rim flange abuts the tire. This may cause the rim to disengage.

On the other hand, in recent years, there has been a strong demand for reduction in tire weight. As such, weight reduction in run-flat tires has also been looked into. For example, Japan unexamined Patent Publication No. 2002-301915 describes devising the shape of a bead core to provide a pneumatic tire including a side reinforcing layer with a crescent-shaped cross-sectional shape that includes no bead filler. Such a tire may have reduced tire weight, however, rim disengagement caused by the rotational force about the point as a fulcrum where the rim flange abuts the tire has not been considered. Thus, the tire does not have sufficient rim disengagement prevention properties. There is a demand for further measures to improve rim disengagement resistance and reduce tire weight.

SUMMARY

The present technology provides a pneumatic tire including a side reinforcing layer in a sidewall portion, the pneumatic tire having an enhanced bead portion structure, reduced tire weight, and good rim disengagement resistance.

A pneumatic tire according to an embodiment of the present technology includes a tread portion with an annular shape that extends in a tire circumferential direction, a pair of sidewall portions disposed on either side of the tread portion, a pair of bead portions disposed toward the inside of the sidewall portions in a tire radial direction, a bead core disposed in each one of the pair of bead portions, a carcass layer mounted between the pair of bead portions, and a side reinforcing layer having a crescent-shaped cross-section disposed toward the inside in a tire lateral direction of the carcass layer at each one of the pair of sidewall portions. The bead core includes at least one bead wire wound in the tire circumferential direction, in a meridian cross-section, a plurality of circumferential portions of the bead wire form at least one row in line in the tire lateral direction and a plurality of layers layered in the tire radial direction, in a meridian cross-section, an external contour shape of the bead core is a polygon formed by common tangent lines of the circumferential portions of the bead wire, the external contour shape includes a single vertex Q located toward the outside in the tire radial direction, an internal angle $\theta 1$ formed by two sides sandwiching the vertex Q is an acute angle, and the external contour shape includes a bottom side located toward the inside in the tire radial direction at a position opposite the vertex Q and extending in the tire lateral direction, the carcass layer includes a body portion that extends from the tread portion, through a sidewall portion of the pair of sidewall portions, to a bead portion of the pair of bead portions, and a folded back portion that is bent and folded back along a circumference of the bead core in each one of the bead portions and extends from a position of an outer end of the bead core in the tire radial direction toward one of the pair of sidewall portions in contact with the body portion, and a straight line extending in the tire lateral direction through the vertex Q is defined as a straight line L1, a straight line extending in the tire radial direction through the vertex Q is defined as a straight line L2, an arc constituting a profile of a portion of a tire outer surface located on an extension line of the straight line L1 is defined as an arc R, a distance in the tire radial direction between a center O of the arc R and the straight line L1 is within 20% of a radius r of the arc R, and a distance in the tire lateral direction between the center O of the arc R and the straight line L2 with respect to the radius r of the arc R is within a range of $2r \pm 0.4r$.

In the present technology, the bead core has the structure described above. Thus, the number of times the bead wire is wound near the vertex of the external contour shape is reduced, and the number of times the bead wire is wound near the bottom side is sufficiently ensured. Accordingly, the performance of the bead core is sufficiently maintained and tire durability is ensured and the amount of bead wire used can be reduced to reduce tire weight. Also, the carcass is folded back bending along the bead core with such a shape. Thus, the closed region surrounded by the body portion and the folded back portion of the carcass layer essentially includes only the bead core. This allows the tire weight to be lower than that of tires with a known bead filler. Here, the carcass layer is bent and folded back, giving the bead core a shape with a single vertex as described above. This prevents the carcass layer from being too sharply bent. Furthermore, with the folded back portion of the carcass layer being in contact with the body portion, failures caused by stress concentration at the terminating end of the folded back portion can be prevented. Also, by the relationship between the bead core and the profile of the tire outer surface being set as described above, the cross-section of the tire in the region of the bead core is given a good shape and the portion where the rim flange abuts the tire is given a suitable recessed shape. Thus, the rigidity of this portion can be suppressed to an appropriate range and rim disengagement resistance can be enhanced.

In an embodiment of the present technology, at least a portion of the bead wire is packed in layers. In this way, the bead wire is closely arranged and the space filling ratio is increased and the bead core structure is optimized. This is advantageous in that the good rigidity and pressure resistance performance of the bead portion can be maintained, running performance can be maintained, tire weight can be reduced, and these performances can be obtained in a well-balanced manner.

In an embodiment of the present technology, an extension line of an inner side in the tire lateral direction of the two sides sandwiching the vertex Q is defined as an extension line L3, an extension line of a portion of the carcass layer in a region A between an auxiliary line a1 and an auxiliary line a2 is defined as an extension line L4, where the auxiliary line a1 passes through the center O of the arc R and forms a 60° angle with the straight line L1 and the auxiliary line a2 passes through the center O of the arc R and forms a 10° angle with the straight line L1, the extension line L4 is inclined further toward the outside in the tire lateral direction than the extension line L3, and an angle α1 formed by the extension line L3 and the extension line L4 is preferably from 0° to 20°. In this way, the tire in the region of the bead portion is given a good cross-sectional structure and the portion where the rim flange abuts the tire is given a more appropriate recessed shape. This is advantageous in that the rigidity of this portion is suppressed to an appropriate range and rim disengagement resistance is enhanced.

In an embodiment of the present technology, an extension line of a portion of the carcass layer in a region A between an auxiliary line a1 and an auxiliary line a2 is defined as an extension line L4, where the auxiliary line a1 passes through the center O of the arc R and forms a 60° angle with the straight line L1 and the auxiliary line a2 passes through the center O of the arc R and forms a 10° angle with the straight line L1, an extension line of an outer side in the tire lateral direction of the two sides sandwiching the vertex Q is defined as an extension line L5, and the internal angle θ1 formed by the two sides sandwiching the vertex Q and an angle α2 formed by the extension line L4 and the extension line L5 preferably satisfy a relationship $0.30 \leq \theta 1/\alpha 2 \leq 1.0$. In this way, the tire in the region of the bead portion is given a good cross-sectional structure. This is advantageous in that the rigidity of this portion is suppressed to an appropriate range and rim disengagement resistance is enhanced.

In an embodiment of the present technology, preferably a folded back portion of the carcass layer contacting the bead core terminates in a region A between an auxiliary line a1 and an auxiliary line a2, where the auxiliary line a1 passes through the center O of the arc R and forms a 60° angle with the straight line L1 and the auxiliary line a2 passes through the center O of the arc R and forms a 10° angle with the straight line L1. In this manner, the rigidity at each portion in the tire radial direction is appropriately adjusted, which is advantageous in enhancing rim disengagement resistance. This is advantageous in that the amount of the carcass layer used can be reduced and tire mass can be reduced.

In an embodiment of the present technology, preferably an inner end portion in the tire lateral direction of the side reinforcing layer is located in a region A between an auxiliary line a1 and an auxiliary line a2, where the auxiliary line a1 passes through the center O of the arc R and forms a 60° angle with the straight line L1 and the auxiliary line a2 passes through the center O of the arc R and forms a 10° angle with the straight line L1. In this manner, the rigidity at each portion in the tire radial direction is appropriately adjusted, which is advantageous in enhancing rim disengagement resistance. This is advantageous in that the amount of the side reinforcing layer used can be reduced and tire mass can be reduced.

In the present technology, each dimension is measured with the tire mounted on a regular rim and inflated to the regular internal pressure. "Regular rim" is a rim defined by a standard for each tire according to a system of standards that includes standards on which tires are based, and refers to a "standard rim" in the case of JATMA (Japan Automobile Tyre Manufacturers Association, Inc.), refers to a "design rim" in the case of TRA (The Tire and Rim Association, Inc.), and refers to a "measuring rim" in the case of ETRTO (European Tire and Rim Technical Organization). "Regular internal pressure" is an air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. "Regular internal pressure" is 180 kPa for a tire on a passenger vehicle.

DETAILED DESCRIPTION

Configurations of embodiments of the present technology will be described in detail below with reference to the accompanying drawings.

Figure 1:
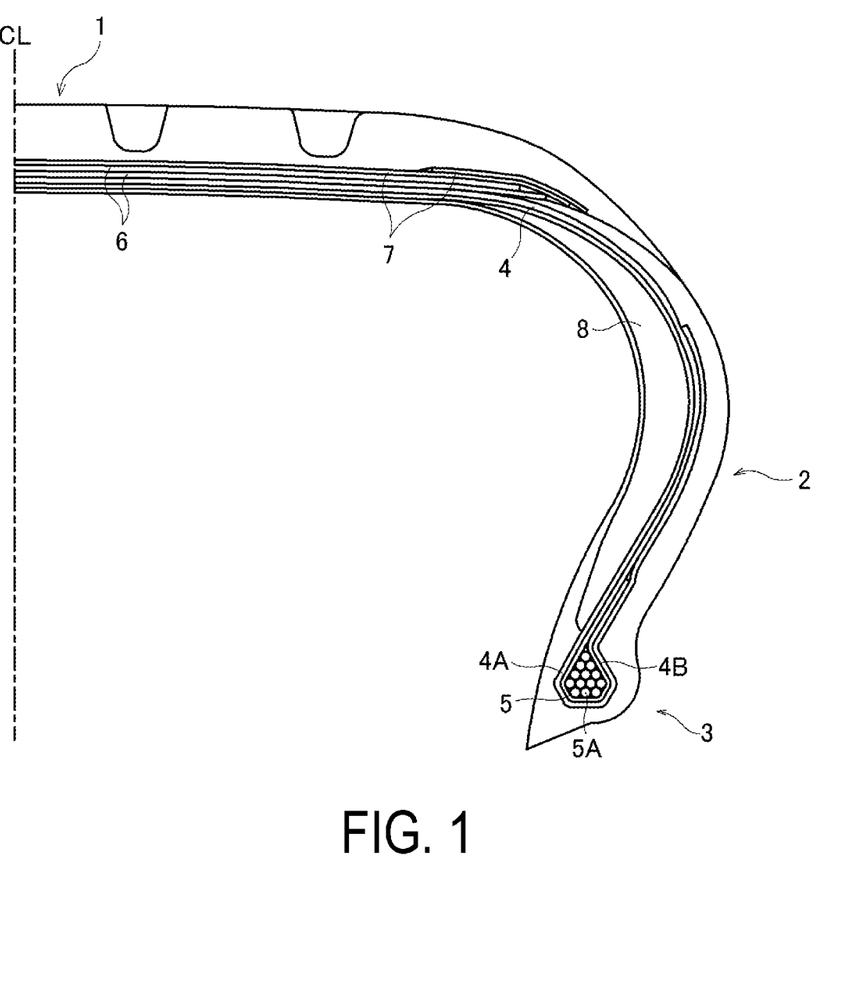
FIG. 1 is a half cross-sectional view taken along a meridian of a pneumatic tire according to an embodiment of the present technology.

As illustrated in FIG. 1, the pneumatic tire of an embodiment of the present technology includes an annular tread portion 1 extending in the tire circumferential direction, a pair of sidewall portions 2 disposed on both sides of the tread portion 1, and a pair of bead portions 3 disposed toward the inside of the sidewall portions 2 in the tire radial direction. Note that "CL" in FIG. 1 denotes the tire equator.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. In the following description, a portion from the tread portion 1 passed the sidewall portion 2 to the bead portion 3 is referred to as a body portion 4A, and a portion in the bead portion 3 folded back around the bead core 5 and extends toward the sidewall portion 2 is referred to as 4B. Note that in the illustrated example, two carcass layers 4 are provided. In the following description, the layer disposed toward the inside in the tire radial direction in the tread portion 1 is referred to as a first layer and the layer toward the outside in the tire radial direction in the tread portion 1 is referred to as a second layer. In the bead portion 3, the second layer is in contact with the bead core 5 and the first layer surrounds the bead core 5 with the second layer disposed therebetween.

Figure 2:
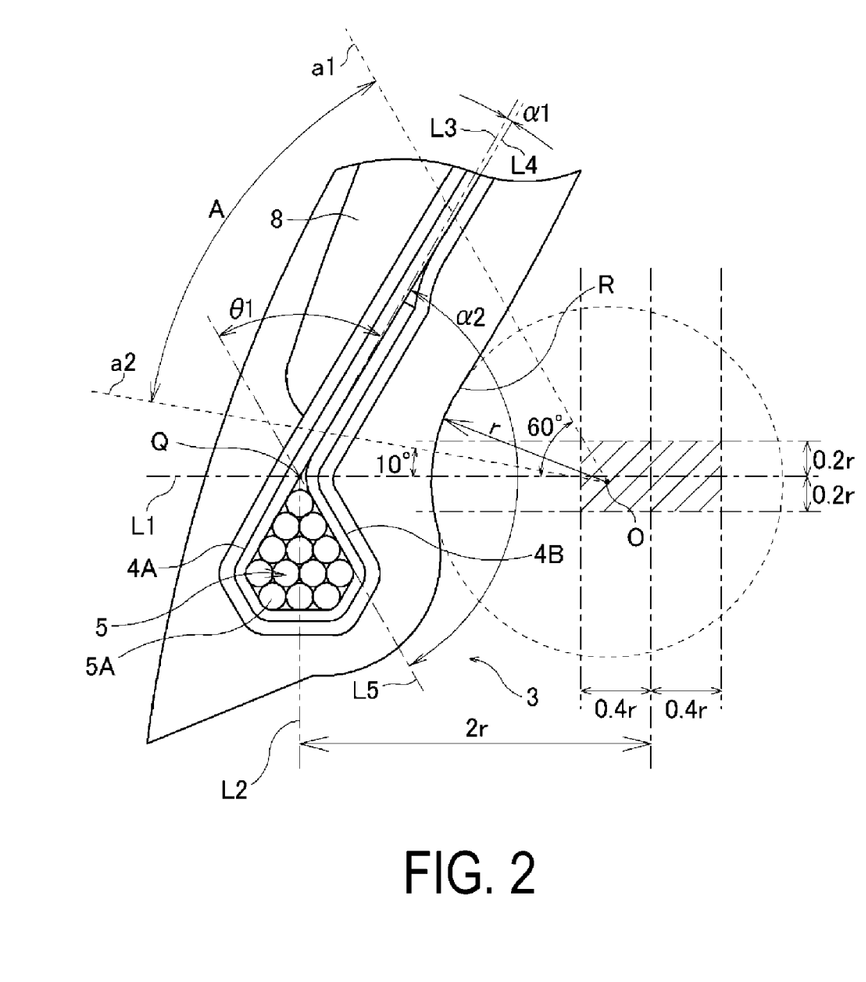
FIG. 2 is an enlarged explanatory diagram illustrating a region including a bead portion of FIG. 1.
Figure 3:
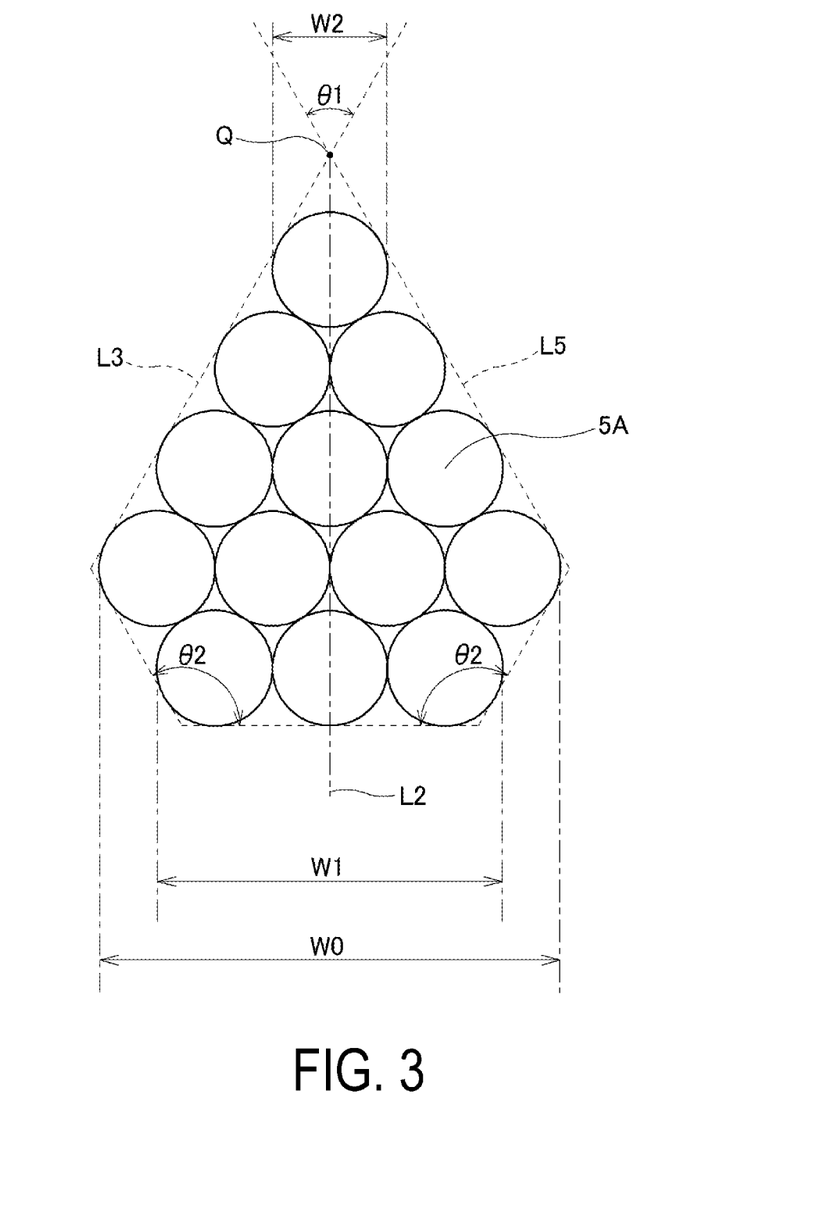
FIG. 3 is an enlarged explanatory diagram illustrating a bead core of FIG. 2.

As illustrated in an enlarged manner in FIGS. 2 and 3, the bead core 5 includes at least one bead wire 5A wound in the tire circumferential direction. The circumferential portions of the bead wire 5A form at least one row in line in the tire lateral direction and a plurality of layers layered in the tire radial direction. In the present technology, with the plurality of circumferential portions of the bead wire 5A being formed from rows and layers as viewed in a meridian cross-section, the structure may be a one-wire structure of a single bead wire 5A wound continuously around or a layered wound structure of a plurality of bead wires 5A bunched together and wound. In the illustrated example, the structure includes totally five layers being layered. The five layers includes, from the inner side in the tire radial direction, a layer including a row of three circumferential portions, a layer including a row of four circumferential portions, a layer including a row of three circumferential portions, a layer including a row of two circumferential portions, and a layer including a row of one circumferential portion. Note that in the following description, this structure is referred to as a "3+4+3+2+1 structure". In the following description, the multilayer structure of the bead wire 5A is expressed in a similar format using "+" between the number of rows included in each of the layers listed in order from the inner side in the tire radial direction. Furthermore, in the bead core 5 of the illustrated example, the bead cores 5A are packed together in layers. Note that "packed" refers to a way of packing in which the centers of three circumferential portions in contact with one another make a substantially regular triangle or a packing method with a high space filling ratio such as the hexagonal filling arrangement.

Here, each of the bead core 5 has an external contour shape (dashed line in the drawings) of a polygon formed by tangent lines common between circumferential portions of the bead wire 5A as viewed in a meridian cross-section. This external contour shape includes a single vertex Q located toward the outside in the tire radial direction and a bottom side extending in the tire lateral direction located toward the inside in the tire radial direction at a position opposite the vertex Q. In particular, the bead core 5 of the illustrated example has a pentagonal external contour shape with the 3+4+3+2+1 structure described above. In the present technology, the internal angle θ1 formed by two sides on either side of the vertex Q is required to be an acute angle (preferably 60°±20°), and the bead core 5 has an overall shape that tapers gradually decreasing in width from the widest portion toward the outside in the tire radial direction (this shape is also referred to as a "radially outward wedge shape").

The carcass layer 4 is folded back around the bead core 5 as described above. With the bead core 5 of the present technology having a special shape (radially outward wedge shape) as described above, the carcass layer 4 bends around the circumference of the bead core 5. For example, in the illustrated example, the bead core 5 satisfies the details described above, giving it a substantially pentagonal cross-sectional shape. Accordingly, the carcass layer 4 that extends around the circumference of the bead core 5 bends forming a substantially pentagonal shape. Furthermore, the portion of the folded back portion 4B of the carcass layer 4 located further toward the outside in the tire radial direction than a radially outer end of the bead core 5 extends toward the sidewall portion 2 along the body portion 4A of the carcass layer 4 in contact with the body portion 4A of the carcass layer 4. As a result, the body portion 4A and the folded back portion 4B of the carcass layer 4 form a closed region around the bead core 5.

A plurality (in the illustrated example, two layers) of belt layers 6 are embedded on an outer circumferential side of the carcass layer 4 in the tread portion 1. The belt layers 6 each include a plurality of reinforcing cords that are inclined with respect to the tire circumferential direction. The reinforcing cords of the different layers arranged in a criss-cross manner. In these belt layers 6, the inclination angle of the reinforcing cords with respect to the tire circumferential direction ranges from, for example, 10° to 40°. In addition, a belt reinforcing layer 7 is provided on the outer circumferential side of the belt layers 6. In particular, in the illustrated example, a full cover layer covering the entire width of the belt layers 6 and two edge cover layers covering only the end portions of the belt reinforcing layer 7 on both sides are provided. The belt reinforcing layer 7 includes organic fiber cords oriented in the tire circumferential direction. In the belt reinforcing layer 7, the angle of the organic fiber cords with respect to the tire circumferential direction is set, for example, to from 0° to 5°.

A side reinforcing layer 8 with a crescent-shaped cross-section is disposed on the inner side in the tire lateral direction of the carcass layer 4 in the sidewall portion 2. The side reinforcing layer 8 is made of rubber harder than the rubber of the sidewall portion 2. Specifically, the rubber of the side reinforcing layer 8 has a JIS (Japanese Industrial Standard)-A hardness of from 70 to 80, for example, and a modulus at 100% elongation of from 9.0 MPa to 10.0 MPa. The side reinforcing layer 8 with such physical properties has sufficient rigidity to enable run-flat running by bearing the load when the tire has a puncture.

In the bead portion 3 of the present technology, the bead core 5 has the above-described special shape (radially toward the outside wedge shape), and the portion of the tire outer surface that abuts the rim flange in a meridian cross-section is formed with a recess, as with the bend of the carcass layer 4. Specifically, as illustrated in FIG. 2, the straight line extending in the tire lateral direction through the vertex Q of the external contour shape is define as straight line L1, the straight line extending in the tire radial direction through the vertex Q is defined as straight line L2, and the arc constituting the profile of the portion of the tire outer surface located on the extension line of the straight line L1 is defined as arc R. The distance in the tire radial direction between a center O of the arc R and the straight line L1 is within 20% of a radius r of the arc R. The distance in the tire lateral direction between the center O of the arc R and the straight line L2 with respect to the radius r of the arc R is within a range of 2r±0.4r. That is the center O of the arc R of the radius r constituting the profile of the portion of the tire outer surface located on the extension line of the straight line L1 is located in the region (hatched portion in the drawing) defined by two straight lines 20% of the radius r of the arc R away from the straight line L1 toward the inside and toward the outside in the tire radial direction, a straight line 160% of the radius of the arc R away from the straight line L2 toward the outside in the tire lateral direction, and a straight line 240% of the radius of the arc R away from the straight line L2 toward the outside in the tire lateral direction.

In the present technology, the bead core 5 has a special shape (radially outward wedge shape) as described above. Thus, the number of times the bead wire 5A is wound near the vertex Q of the external contour shape is reduced, and the number of times the bead wire 5A is wound near the bottom side of the external contour shape is sufficiently ensured. Accordingly, the function of the bead core 5 is sufficiently maintained and tire durability is ensured and the amount of bead wire 5A used can be reduced to reduce tire weight. Also, the carcass layer 4 is folded back bending along the bead core 5 with such a shape. Thus, the closed region surrounded by the body portion 4A and the folded back portion 4B of the carcass layer 4 essentially includes only the bead core 5. This allows the tire weight to be lower than that of tires with a known bead filler. Here, the carcass layer 4 is bent and folded back, giving the bead core 5 a shape with a single vertex Q as described above. This prevents the carcass layer 4 from being too sharply bent. Furthermore, by the folded back portion 4B of the carcass layer 4 being in contact with the body portion 4A, failures caused by stress concentration at the terminating end of the folded back portion 4B can be prevented. Also, by the relationship between the bead core 5 and the profile of the tire outer surface being set as described above, the cross-section of the tire in the region of the bead core 5 is given a good shape and the portion where the rim flange abuts the tire is given a suitable recessed shape. Thus, the rigidity of this portion can be suppressed to an appropriate range and rim disengagement resistance can be enhanced.

In the structure described above, when the internal angle $\theta 1$ is an obtuse angle, in order to appropriately fold back the carcass layer 4 around the bead core 5, there is a need to dispose a bead filler on the outer side of the bead core 5 in the tire radial direction. This makes effectively reducing tire weight difficult. When the positional relationship between the center O of the arc R and the straight lines L1 or L2 is not within the range described above, the cross-sectional shape of the tire in the region of the bead core 5 is not appropriate, and an effect of enhancing rim disengagement resistance cannot be obtained.

As illustrated in FIG. 3, a maximum width W0 of the bead core 5, a width W1 of the innermost layer in the tire radial direction, and a width W2 of the outermost layer in the tire radial direction, preferably satisfy the relationships W1>W2 and W2≤0.5×W0. Also, the layer with the maximum width W0 of the layers of the bead core 5 is preferably disposed toward the inside in the tire radial direction of the center position of the bead core 5 in the tire radial direction. As illustrated in the drawings, note that the widths W0 to W2 are the lengths in the tire lateral direction between outer ends in the tire lateral direction of the circumferential portions on both sides in the tire lateral direction of each layer. In a configuration in which the widths W0, W1, and W2 do not satisfy the relationships described above, the shape of the bead core 5 is not suitable and the shape of the bead portion 3 cannot be stabilized. In particular, when the configuration has the relationships W1≤W2 and W2>0.5×W0, the width of the upper end of the bead core 5 is large. Thus, the rigidity of the region where the rim flange abuts the tire increases and suppressing rim disengagement caused by the rotational force about the point as a fulcrum where the rim flange abuts the tire is difficult, resulting in rim disengagement resistance decreasing.

The specific shape of the bead core 5 is not particularly limited and is only required to have the relationships described above. For example, the shapes illustrated in FIGS. 4A to 4D may be employed. The examples of FIGS. 4A to 4D all satisfy the relationships described above and correspond to the "radially outward wedge shape" of the present technology. Specifically, FIG. 4A illustrates a 5+4+3+2+1 packed structure, FIG. 4B illustrates a 4+5+4+3+2+1 packed structure, FIG. 4C illustrates a 3+4+4+3+2+1 packed structure, and FIG. 4D illustrates a 3+4+4+3+2+1 structure in which the second layer from the innermost layer in the tire radial direction and the layer adjacent thereto located toward the inside in the tire radial direction are stacked in alignment rather than being packed (stacked in a manner that adjacent circumferential portions in the tire radial direction are layered on one another perpendicular to the tire lateral direction).

Of the various shapes that the bead core 5 can have, an internal angle $\theta 2$ of the corner portion located at either end of the bottom side of the external contour shape is preferably 90° or greater and more preferably from 100° to 150°. That is, in the examples of FIGS. 4A to 4D, the structures of FIGS. 4B to 4D are preferable. Setting the internal angle $\theta 2$ in this manner has the advantage in that the arrangement of the bead wire 5A can be prevented from being disrupted in vulcanization and the shape of the bead core 5 after vulcanization is improved. This allows the tire weight to be reduced and good rigidity to be maintained. When the internal angle $\theta 2$ is less than 90°, the number of times the bead wire 5A is wound cannot be sufficiently reduced and the reducing effect of tire weight is decreased. Also, when the internal angle $\theta 2$ is less than 90°, the bead wire 5A located on either end of the bottom side of the external contour shape is subjected to the effects of rubber flow during vulcanization to a greater extent and the good shape of the bead core 5 after vulcanization is difficult to maintain.

Figure 4A:
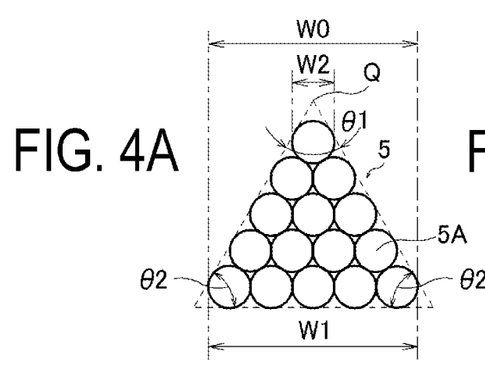
FIGS. 4A to 4D are schematic views illustrating the bead core according to another embodiment of the present technology.
Figure 4B:
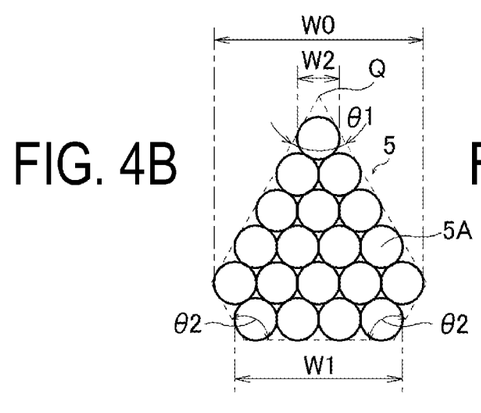
Figure 4C:
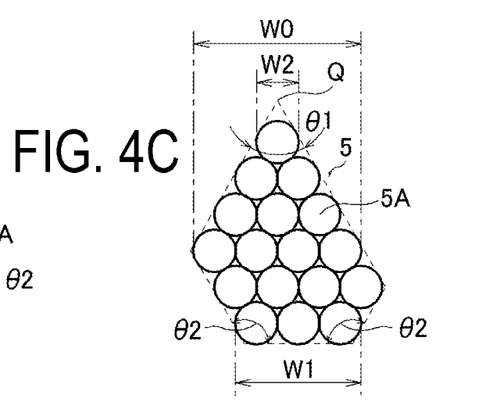
Figure 4D:
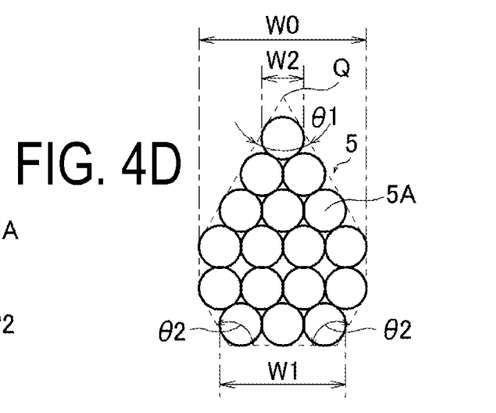

In the structures illustrated in FIGS. 4A to 4D, at least one portion is packed together in layers. Compared to a structure in which the bead wires are all stacked in alignment, this allows the bead wire 5A to be fit close together and the space filling ratio of the bead wire 5A to higher. As a result, the good rigidity and pressure resistance performance of the bead portion 3 can be ensured, running performance can be maintained, and tire weight can be reduced, these performances being obtained in a well-balanced manner. Focusing on the space filling ratio of the bead wire 5A, preferably all of the bead wire 5A is packed together in layers, as illustrated in FIGS. 4A to 4C.

Also, focusing on the shape of the bead core 5, to increase the stability of the overall shape of the bead core 5, the overall shape of the bead core 5 is preferably axisymmetric with respect to the center of the bead core 5 in the tire lateral direction. From this perspective, shapes such as those illustrated in FIGS. 4A, 4B, and 4D are preferable.

The shapes of the bead core 5 can be selected as appropriate depending on the important characteristics, the overall structure of the pneumatic tire and the like on the basis taking into account the various perspectives described above.

The structure of the bead wire 5A itself is not particularly limited, but taking into account improving tire weight reduction and rim disengagement resistance in a compatible manner, the average diameter is preferably from 0.8 mm to 1.8 mm, more preferably from 1.0 mm to 1.6 mm, and even more preferably from 1.1 mm to 1.5 mm. Also, the total cross-sectional area of the bead wire 5A (the sum of the cross-sectional areas of the circumferential portions of the bead wires 5A included in a meridian cross-section of the bead core 5) is preferably from 10 $mm^2$ to 50 $mm^2$, more preferably from 15 $mm^2$ to 48 $mm^2$, and even more preferably from 20 $mm^2$ to 45 $mm^2$. When the average diameter of the bead wire 5A is less than 0.8 mm, the effect of improving the rim disengagement resistance is limited. When the average diameter of the bead wire 5A is greater than 1.8 mm, the effect of reducing tire weight is limited. When the total cross-sectional area of the bead wire 5A is less than 10 $mm^2$, the effect of improving the rim disengagement resistance is limited. When the total cross-sectional area of the bead wire 5A is greater than 50 $mm^2$, the effect of reducing tire weight is limited.

As described above, in the present technology, the closed region formed by the body portion 4A and the folded back portion 4B of the carcass layer 4 essentially only includes the bead core 5. A bead filler such as those used in known pneumatic tires or similar tire component (a member that increases rigidity from the bead portion 3 to the sidewall portion 2 disposed toward the outside of the bead core 5 in the tire radial direction and surrounded by the body portion 4A and the folded back portion 4B of the carcass layer 4) is not disposed. In other words, though insulation rubber covering the bead wire 5A or rubber filling the small gaps between the bead core 5 and the carcass layer 4 may be disposed, a bead filler with a large volume such as those in known pneumatic tires is not used. With this substantially bead filler-less structure, tire weight can be effectively reduced. Here, the ratio of a total area a of the rubber in the closed region to an area A of the closed region in a meridian cross-section (a/A×100%) is defined as the rubber occupation rate of the closed region. The rubber occupation rate is preferably from 0.1% to 15%. A rubber occupation rate of the closed region of greater than 15% is essentially the same as the known pneumatic tire including a bead filler and a further increase to the effect of reducing tire weight is difficult. Note that because rubber such as insulation rubber is always disposed covering the bead wire 5A due to the tire structure, a rubber occupation rate of the closed region of less than 0.1% is basically impossible.

In the present technology, the portion of the tire outer surface of the bead portion 3 described above where the rim flange abuts is recessed. To facilitate this, the arrangement of the tire components is preferably adjusted as described below.

For example, as illustrated in FIG. 2, the extension line of the inner side in the tire lateral direction of the two sides sandwiching the vertex Q is defined as an extension line L3 and the extension line of the portion of the carcass layer 4 in a region A between an auxiliary line a1 and an auxiliary line a2 is defined as an extension line L4, where the auxiliary line a1 passes through the center O of the arc R and forms a 60° angle with the straight line L1 and the auxiliary line a2 passes through the center O of the arc R and forms a 10° angle with the straight line L1. The extension line L4 is preferably inclined further toward the outside in the tire lateral direction than the extension line L3, and an angle α1 formed by the extension line L3 and the extension line L4 is preferably from 0° to 20°. In other words, when the carcass layer 4 is mounted between the bead portions, the carcass layer 4 is preferably bent with an incline of from 0° to 20° more than the straight line L3 toward the outside in the tire lateral direction in the region A. In this way, the tire in the region of the bead portion is given a good cross-sectional structure and the portion where the rim flange abuts the tire is given a more appropriate recessed shape. This is advantageous in that the rigidity of this portion is suppressed to an appropriate range and rim disengagement resistance is enhanced. When the angle α1 is less than 0° (in other words, the extension line L4 is inclined toward the inside in the tire lateral direction more than the extension line L3) or the angle α1 is greater than 20°, the tire shape is not suitable to obtain an effect of enhancing rim disengagement resistance.

Furthermore, as illustrated in FIG. 2, the relationship between an internal angle θ1 formed by the two sides sandwiching the vertex Q and the angle α2 formed by the extension line L4 and an extension line L5 of the outer side in the tire lateral direction of the two sides that sandwich the vertex Q preferably satisfies 0.30≤θ1/α2≤1.0. In this way, the tire in the region of the bead portion is given a better cross-sectional structure. This is advantageous in that the rigidity of this portion is suppressed to an appropriate range and rim disengagement resistance is enhanced. When the angle α2 is outside of the range described above, the balance between the shape of the bead core 5 and the inclination of the carcass layer 4 in the region A is unsuitable to sufficiently obtain an effect of enhancing rim disengagement resistance.

Also, the folded back portion 4B of the carcass layer 4 (second layer in the illustrated example) contacting the bead core 5 preferably terminates within the region A described above. Note that, disposing the end portion of the folded back portion 4B of the carcass layer 4 (the first layer in the illustrated example) not in direct contact with the bead core 5 is not particularly limited. By disposing the end portion of the carcass layer 4 in this manner, the rigidity at each portion in the tire radial direction is appropriately adjusted, which is advantageous in enhancing rim disengagement resistance. This is advantageous in that the amount of the carcass layer 4 used can be reduced and tire mass can be reduced.

Similarly, the inner end portion in the tire lateral direction of the side reinforcing layer 8 is preferably disposed in the region A described above. By disposing it in this manner, the rigidity at each portion in the tire radial direction is appropriately adjusted, which is advantageous in enhancing rim disengagement resistance. This is advantageous in that the amount of the side reinforcing layer 8 used can be reduced and tire mass can be reduced.

The structure of each component described above can be appropriately combined and used. In any case, a pneumatic tire with a structure such as that described above has an enhanced bead portion 3 structure. Thus, tire durability can be maintained and tire weight reduced and rim disengagement resistance can be enhanced.

EXAMPLE 33 types of pneumatic tires including Conventional Example 1, Comparative Examples 1 to 6, and Examples 1 to 26 having a tire size of 205/55R16 and the basic structure illustrated in FIG. 1 were manufactured. The pneumatic tires were set as indicated in Tables 1 to 4 for: bead core structure, presence of bead filler, distance in the tire radial direction between straight line L1 extending in the tire lateral direction through the vertex Q of the external contour shape of the bead core and the center O of the arc R constituting the profile of the portion of the tire outer surface located on the extension line of the straight line L1, distance in the tire lateral direction between the straight line L2 extending in the tire radial direction through the vertex Q of the external contour shape of the bead core and the center O, angle α1 formed by the extension line L3 of the inner side in the tire lateral direction of the two sides sandwiching the vertex Q and the extension line L4 of the portion of the carcass layer in the region A, ratio θ1/α2 between the internal angle θ1 formed by the two sides sandwiching the vertex Q and the angle α2 formed by the extension line L4 of the portion of the carcass layer in the region A and the extension line L5 of the outer side in the tire lateral direction of the two sides sandwiching the vertex Q, position of the end portion of the carcass layer, position of the end portion of the side reinforcing layer, and number of carcass layers.

The number in the row for "bead core structure" in Tables 1 to 4 indicates the corresponding figure number. Note that Conventional Example 1 is an example including a known and typical bead core. This bead core has the 5+5+5 stacked in alignment structure illustrated in FIG. 5A. The bead core of Comparative Example 1 has the 5+5+4+3+2+1 stacked in alignment structure illustrated in FIG. 5B. The bead core of Comparative Example 2 has the packed 8+7+6+4+2 structure illustrated in FIG. 5C.

The "distance between the straight line L1 and the center O" and "distance between the straight line L2 and the center O" in Tables 1 to 4 are indicated by a ratio (%) to the radius r of the arc R. Also, "distance between the straight line L1 and the center O" is indicated by a negative value when located toward the inside in the tire radial direction and by a positive value when located toward the outside in the tire radial direction. For "α1", when the extension line L4 is inclined further toward the inside in the tire lateral direction than the extended line L3, the angle is indicated by a negative value. For the "position of the end portion of the carcass layer" and "position of the end portion of the side reinforcing layer", both ends being located in the region A is indicated by "within A", both ends being located toward the inside of the region A in the tire radial direction is indicated by "outside A (inward)", and both ends being located toward the outside of the region A in the tire radial direction is indicated by "outside A (outward)".

Note that in Conventional Example 1 and Comparative Example 2, the shape of the bead core is greatly different and the vertex Q is not provided. Thus, for reference, the center in the tire lateral direction of the top surface of the external contour shape of the bead core is defined as the vertex and the straight lines L1, L2 are drawn to these Examples, and "distance between the straight line L1 and the center O" and "distance between the straight line L2 and the center O" are found and indicated in the Tables. Also to these Examples, the extension line L3 is defined by the extension line of the inner side in the tire lateral direction of the two sides sandwiching the "top surface", and the extension line L4 is defined by the extension line of the outer side in the tire lateral direction of the two sides sandwiching the "top surface". Thus, these are used to find the values corresponding to "α1" and "θ1/α2". Tire mass and rim disengagement resistance of the pneumatic tires are evaluated by the following evaluation method and the results are also shown in Tables 1 to 4.

Tire Mass

The mass of each of five test tires was measured and the average value was found. Evaluation results are expressed as index values with Conventional Example 1 being assigned the index value of 100. Smaller index values indicate smaller tire mass.

Rim Disengagement Resistance

The test tires were mounted on wheels with a rim size of 16×7.0 J, and the wheels were mounted on a test vehicle with an engine displacement of 2.0 L. The test vehicle was driven in a straight line on a flat asphalt road surface at a speed of 35.5 km/h and then suddenly turned to right at an angle of 180 degrees in a turning radius of 6 m and stopped (J-turn test). This test was repeated. At this test, an air pressure was gradually decreased from 150 kPa by 10 kPa each time. The air pressure when air leakage was occurred was measured as the evaluation of rim disengagement resistance. The evaluation results are expressed as index values using the reciprocal of the measurement values, with the value of Conventional Example 1 being assigned the index value of 100. Larger index values indicate superior rim disengagement resistance.

TABLE 1

Figure 5A:
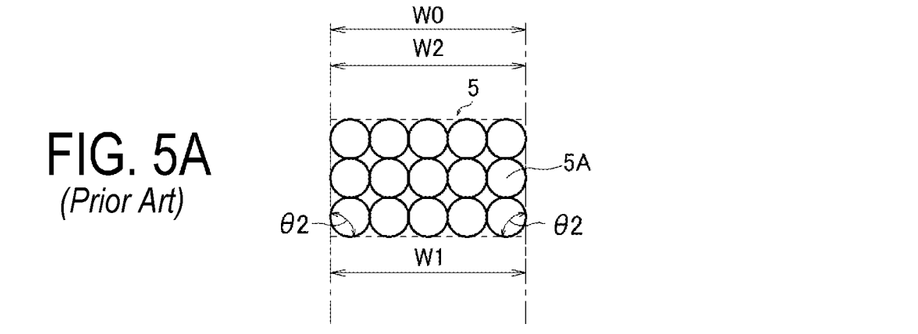
FIGS. 5A to 5C are explanatory diagrams schematically illustrating a bead structure of a Conventional Example and a Comparative Example.
Figure 5B:
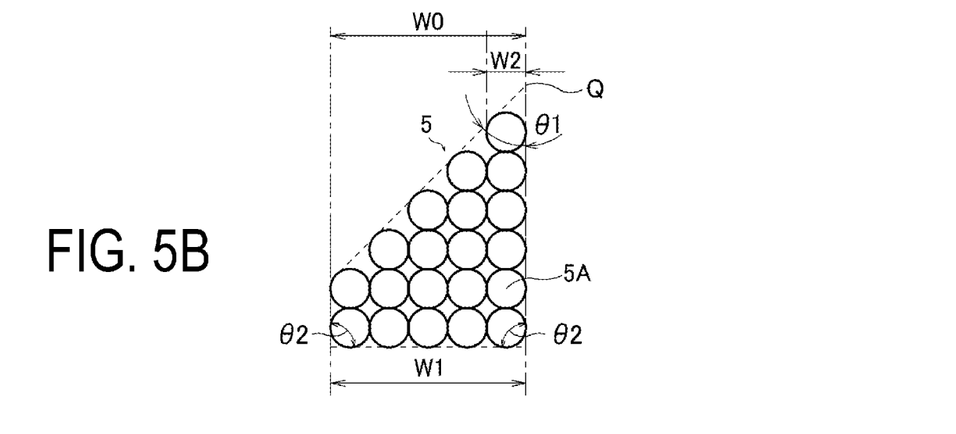
Figure 5C:
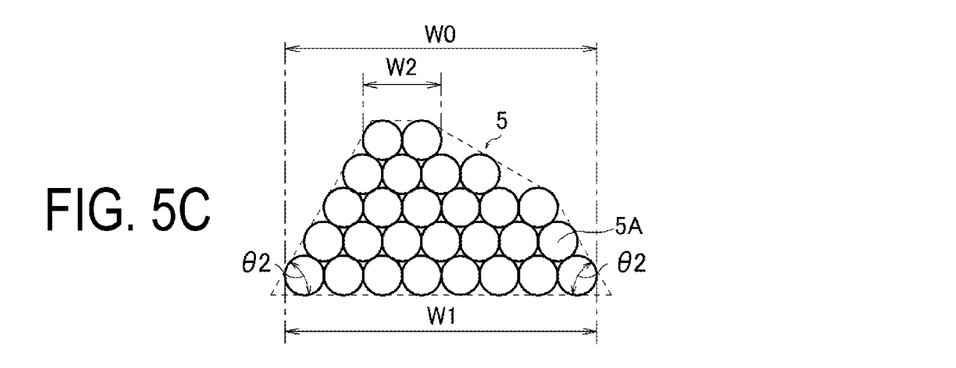

|  |  | Conventional Example 1 | Comparative Example 1 | Comparative Example 2 |
|---|---|---|---|---|
| Bead core structure |  | FIG. 5A | FIG. 5B | FIG. 5C |
| Bead filler |  | Yes | No | Yes |
| Distance between straight line L1 and center O | [%] | 0 | −25 | 0 |
| Distance between straight line L2 and center O |  | 2r | 2r | 2.5r |
| α1 | [°] | 0 | 0 | 0 |
| θ1/α2 |  | 0 | 0.2 | 1 |
| Position of end portion of carcass layer |  | Within A | Within A | Within A |
| Position of end portion of side reinforcing layer |  | Within A | Within A | Within A |
| Number of carcass layers |  | 2 | 2 | 2 |
| Tire mass | Index value | 100 | 95 | 105 |
| Rim disengagement resistance | Index value | 100 | 98 | 100 |

|  |  | Example 1 | Example 2 | Example 3 | Example 4 | Example 5 |
|---|---|---|---|---|---|---|
| Bead core structure |  | FIG. 2 | FIG. 4A | FIG. 4B | FIG. 4C | FIG. 4D |
| Bead filler |  | No | No | No | No | No |
| Distance between straight line L1 and center O | [%] | 0 | 0 | 0 | 0 | 0 |
| Distance between straight line L2 and center O |  | 2r | 2r | 2r | 2r | 2r |
| α1 | [°] | 0 | 0 | 0 | 0 | 0 |
| θ1/α2 |  | 0.5 | 0.5 | 0.5 | 0.5 | 0.5 |
| Position of end portion of carcass layer |  | Within A | Within A | Within A | Within A | Within A |

TABLE 1-continued

|  |  |  |  |  |  |
|---|---|---|---|---|---|
| Position of end portion of side reinforcing layer |  | Within A | Within A | Within A | Within A | Within A |
| Number of carcass layers |  | 2 | 2 | 2 | 2 | 2 |
| Tire mass | Index value | 95 | 96 | 98 | 97 | 97 |
| Rim disengagement resistance | Index value | 105 | 105 | 105 | 105 | 105 |

TABLE 2

|  |  | Comparative Example 3 | Example 6 | Example 7 | Comparative Example 4 |
|---|---|---|---|---|---|
| Bead core structure |  | FIG. 2 | FIG. 2 | FIG. 2 | FIG. 2 |
| Bead filler |  | No | No | No | No |
| Distance between straight line L1 and center O | [%] | −25 | −20 | 20 | 25 |
| Distance between straight line L2 and center O |  | 2r | 2r | 2r | 2r |
| α1 | [°] | 0 | 0 | 0 | 0 |
| θ1/α2 |  | 0.5 | 0.5 | 0.5 | 0.5 |
| Position of end portion of carcass layer |  | Within A | Within A | Within A | Within A |
| Position of end portion of side reinforcing layer |  | Within A | Within A | Within A | Within A |
| Number of carcass layers |  | 2 | 2 | 2 | 2 |
| Tire mass | Index value | 95 | 95 | 95 | 95 |
| Rim disengagement resistance | Index value | 98 | 100 | 100 | 98 |

|  |  | Comparative Example 5 | Example 8 | Example 9 | Comparative Example 6 |
|---|---|---|---|---|---|
| Bead core structure |  | FIG. 2 | FIG. 2 | FIG. 2 | FIG. 2 |
| Bead filler |  | No | No | No | No |
| Distance between straight line L1 and center O | [%] | 0 | 0 | 0 | 0 |
| Distance between straight line L2 and center O |  | 1.5r | 1.6r | 2.4r | 2.5r |
| α1 | [°] | 0 | 0 | 0 | 0 |
| θ1/α2 |  | 0.5 | 0.5 | 0.5 | 0.5 |
| Position of end portion of carcass layer |  | Within A | Within A | Within A | Within A |
| Position of end portion of side reinforcing layer |  | Within A | Within A | Within A | Within A |
| Number of carcass layers |  | 2 | 2 | 2 | 2 |
| Tire mass | Index value | 95 | 95 | 95 | 95 |
| Rim disengagement resistance | Index value | 98 | 100 | 100 | 98 |

TABLE 3

|  |  | Example 10 | Example 11 | Example 12 | Example 13 |
|---|---|---|---|---|---|
| Bead core structure |  | FIG. 2 | FIG. 2 | FIG. 2 | FIG. 2 |
| Bead filler |  | No | No | No | No |
| Distance between straight line L1 and center O | [%] | −20 | −5 | 5 | 20 |
| Distance between straight line L2 and center O |  | 1.6r | 1.9r | 2.1r | 2.4r |
| α1 | [°] | 0 | 0 | 0 | 0 |
| θ1/α2 |  | 0.5 | 0.5 | 0.5 | 0.5 |
| Position of end portion of carcass layer |  | Within A | Within A | Within A | Within A |
| Position of end portion of side reinforcing layer |  | Within A | Within A | Within A | Within A |
| Number of carcass layers |  | 2 | 2 | 2 | 2 |
| Tire mass | Index value | 95 | 95 | 95 | 95 |
| Rim disengagement resistance | Index value | 100 | 102 | 102 | 100 |

|  |  | Example 14 | Example 15 | Example 16 | Example 17 |
|---|---|---|---|---|---|
| Bead core structure |  | FIG. 2 | FIG. 2 | FIG. 2 | FIG. 2 |
| Bead filler |  | No | No | No | No |
| Distance between straight line L1 and center O | [%] | 0 | 0 | 0 | 0 |
| Distance between straight line L2 and center O |  | 2r | 2r | 2r | 2r |
| α1 | [°] | −5 | 10 | 20 | 25 |
| θ1/α2 |  | 0.5 | 0.5 | 0.5 | 0.5 |
| Position of end portion of carcass layer |  | Within A | Within A | Within A | Within A |
| Position of end portion of side reinforcing layer |  | Within A | Within A | Within A | Within A |
| Number of carcass layers |  | 2 | 2 | 2 | 2 |
| Tire mass | Index value | 95 | 95 | 95 | 95 |
| Rim disengagement resistance | Index value | 100 | 103 | 101 | 100 |

TABLE 4

|  |  | Example 18 | Example 19 | Example 20 | Example 21 | Example 22 |
|---|---|---|---|---|---|---|
| Bead core structure | | FIG. 2 | FIG. 2 | FIG. 2 | FIG. 2 | FIG. 2 |
| Bead filler | | No | No | No | No | No |
| Distance between straight line L1 and center O | [%] | 0 | 0 | 0 | 0 | 0 |
| Distance between straight line L2 and center O | | 2r | 2r | 2r | 2r | 2r |
| α1 | [°] | 0 | 0 | 0 | 0 | 0 |
| θ1/α2 | | 0.2 | 0.3 | 1.0 | 1.5 | 0.5 |
| Position of end portion of carcass layer | | Within A | Within A | Within A | Within A | Outside A (Inward) |
| Position of end portion of side reinforcing layer | | Within A | Within A | Within A | Within A | Within A |
| Number of carcass layers | | 2 | 2 | 2 | 2 | 2 |
| Tire mass | Index value | 95 | 95 | 95 | 95 | 94 |
| Rim disengagement resistance | Index value | 101 | 103 | 103 | 105 | 103 |

|  |  | Example 23 | Example 24 | Example 25 | Example 26 |
|---|---|---|---|---|---|
| Bead core structure | | FIG. 2 | FIG. 2 | FIG. 2 | FIG. 2 |
| Bead filler | | No | No | No | No |
| Distance between straight line L1 andc enter O | [%] | 0 | 0 | 0 | 0 |
| Distance between straight line L2 and center O | | 2r | 2r | 2r | 2r |
| α1 | [°] | 0 | 0 | 0 | 0 |
| θ1/α2 | | 0.5 | 0.5 | 0.5 | 0.5 |
| Position of end portion of carcass layer | | Outside A (Outward) | Within A | Within A | Within A |
| Position of end portion of side reinforcing layer | | Within A | Outside A (Inward) | Outside A (Outward) | Within A |
| Number of carcass layers | | 2 | 2 | 2 | 1 |
| Tire mass | Index value | 97 | 98 | 93 | 90 |
| Rim disengagement resistance | Index value | 105 | 105 | 103 | 104 |

As can be seen from Tables 1 to 4, each of Examples 1 to 26 have reduced tire mass and enhanced rim disengagement resistance compared to Conventional Example 1, and provides these performances in a balanced and compatible manner. Comparative Example 1 has an unsuitable bead core shape, and thus rim disengagement resistance was degraded. Comparative Example 2 has an unsuitable bead core shape, and thus tire mass was degraded. In Comparative Examples 3 to 6, the distance between the straight lines L1 or L2, and the center O is outside the range of the present technology. Thus, the profile of the tire outer surface was unsuitable and rim disengagement resistance was not improved.

The invention claimed is:

1. A pneumatic tire, comprising:
   a tread portion with an annular shape that extends in a tire circumferential direction;
   a pair of sidewall portions disposed on either side of the tread portion;
   a pair of bead portions disposed toward the inside of the sidewall portions in a tire radial direction;
   a bead core disposed in each one of the pair of bead portions;
   a carcass layer mounted between the pair of bead portions; and
   a side reinforcing layer having a crescent-shaped cross-section disposed toward the inside in a tire lateral direction of the carcass layer at each one of the pair of sidewall portions, wherein
   the bead core comprises at least one bead wire wound in the tire circumferential direction,
   in a meridian cross-section, a plurality of circumferential portions of the bead wire form at least one row in line in the tire lateral direction and a plurality of layers layered in the tire radial direction,
   in a meridian cross-section, an external contour shape of the bead core is a polygon formed by common tangent lines of the circumferential portions of the bead wire, the external contour shape comprises a single vertex located toward the outside in the tire radial direction, an internal angle θ1 formed by two sides sandwiching the vertex is an acute angle, and the external contour shape comprises a bottom side located toward the inside in the tire radial direction at a position opposite the vertex and extending in the tire lateral direction, the carcass layer comprises a body portion that extends from the tread portion, through a sidewall portion of the pair of sidewall portions, to a bead portion of the pair of bead portions, and a folded back portion that is bent and folded back along a circumference of the bead core in each one of the bead portions and extends from a position of an outer end of the bead core in the tire radial direction toward one of the pair of sidewall portions in contact with the body portion, and a straight line extending in the tire lateral direction through the vertex is defined as a straight line L1, a straight line extending in the tire radial direction through the vertex is defined as a straight line L2, an arc constituting a profile of a portion of a tire outer surface located on an extension line of the straight line L1 is defined as an arc, a distance in the tire radial direction between a center of the arc and the straight line L1 is within 20% of a radius r of the arc, and a distance in the tire lateral direction between the center of the arc and the straight line L2 with respect to the radius r of the arc is within a range of $2r \pm 0.4r$.

2. The pneumatic tire according to claim 1, wherein at least a portion of the bead wire is packed in layers.

3. The pneumatic tire according to claim 1, wherein an extension line of an inner side in the tire lateral direction of the two sides sandwiching the vertex is defined as an extension line L3, an extension line of a portion of the carcass layer in a region between an auxiliary line a1 and an auxiliary line a2 is defined as an extension line L4, where the auxiliary line a1 passes through the center of the arc and forms a 60° angle with the straight line L1 and the auxiliary line a2 passes through the center of the arc and forms a 10° angle with the straight line L1, the extension line L4 is inclined further toward the outside in the tire lateral direction than the extension line L3, and an angle α1 formed by the extension line L3 and the extension line L4 is from 0° to 20°.

4. The pneumatic tire according to claim 1, wherein an extension line of a portion of the carcass layer in a region between an auxiliary line a1 and an auxiliary line a2 is defined as an extension line L4, where the auxiliary line a1 passes through the center of the arc and forms a 60° angle with the straight line L1 and the auxiliary line a2 passes through the center of the arc and forms a 10° angle with the straight line L1, an extension line of an outer side in the tire lateral direction of the two sides sandwiching the vertex is defined as an extension line L5, and the internal angle θ1 formed by the two sides sandwiching the vertex and an angle α2 formed by the extension line L4 and the extension line L5 satisfy a relationship $0.30 \le \theta1/\alpha2 \le 1.0$.

5. The pneumatic tire according to claim 1, wherein a folded back portion of the carcass layer contacting the bead core terminates in a region between an auxiliary line a1 and an auxiliary line a2, where the auxiliary line a1 passes through the center of the arc and forms a 60° angle with the straight line L1 and the auxiliary line a2 passes through the center of the arc and forms a 10° angle with the straight line L1.

6. The pneumatic tire according to claim 1, wherein an inner end portion in the tire lateral direction of the side reinforcing layer is located in a region between an auxiliary line a1 and an auxiliary line a2, where the auxiliary line a1 passes through the center of the arc and forms a 60° angle with the straight line L1 and the auxiliary line a2 passes through the center of the arc and forms a 10° angle with the straight line L1.

7. The pneumatic tire according to claim 2, wherein an extension line of an inner side in the tire lateral direction of the two sides sandwiching the vertex is defined as an extension line L3, an extension line of a portion of the carcass layer in a region between an auxiliary line a1 and an auxiliary line a2 is defined as an extension line L4, where the auxiliary line a1 passes through the center of the arc and forms a 60° angle with the straight line L1 and the auxiliary line a2 passes through the center of the arc and forms a 10° angle with the straight line L1, the extension line L4 is inclined further toward the outside in the tire lateral direction than the extension line L3, and an angle α1 formed by the extension line L3 and the extension line L4 is from 0° to 20°.

8. The pneumatic tire according to claim 7, wherein an extension line of a portion of the carcass layer in a region between an auxiliary line a1 and an auxiliary line a2 is defined as an extension line L4, where the auxiliary line a1 passes through the center of the arc and forms a 60° angle with the straight line L1 and the auxiliary line a2 passes through the center of the arc and forms a 10° angle with the straight line L1, an extension line of an outer side in the tire lateral direction of the two sides sandwiching the vertex is defined as an extension line L5, and the internal angle θ1 formed by the two sides sandwiching the vertex and an angle α2 formed by the extension line L4 and the extension line L5 satisfy a relationship $0.30 \le \theta1/\alpha2 \le 1.0$.

9. The pneumatic tire according to claim 8, wherein a folded back portion of the carcass layer contacting the bead core terminates in a region between an auxiliary line a1 and an auxiliary line a2, where the auxiliary line a1 passes through the center of the arc and forms a 60° angle with the straight line L1 and the auxiliary line a2 passes through the center of the arc and forms a 10° angle with the straight line L1.

10. The pneumatic tire according to claim 9, wherein an inner end portion in the tire lateral direction of the side reinforcing layer is located in a region between an auxiliary line a1 and an auxiliary line a2, where the auxiliary line a1 passes through the center of the arc and forms a 60° angle with the straight line L1 and the auxiliary line a2 passes through the center of the arc and forms a 10° angle with the straight line L1.

* * * * *